US 8,408,007 B2

(12) United States Patent
Kamohara et al.

(10) Patent No.: US 8,408,007 B2
(45) Date of Patent: Apr. 2, 2013

(54) INTEGRATED GASIFICATION COMBINED CYCLE AND OPERATION CONTROL METHOD THEREOF

(75) Inventors: Satoru Kamohara, Hyoga (JP); Takashi Sonoda, Hyogo (JP); Yasuhiro Takashima, Hyogo (JP); Yuichiro Kitagawa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 757 days.

(21) Appl. No.: 12/227,706

(22) PCT Filed: Nov. 9, 2007

(86) PCT No.: PCT/JP2007/071820
§ 371 (c)(1),
(2), (4) Date: Nov. 25, 2008

(87) PCT Pub. No.: WO2008/056781
PCT Pub. Date: May 15, 2008

(65) Prior Publication Data
US 2009/0151315 A1 Jun. 18, 2009

(30) Foreign Application Priority Data

Nov. 9, 2006 (JP) ................................. 2006-303782

(51) Int. Cl.
*F02C 9/00* (2006.01)
(52) U.S. Cl. ......................................... 60/773; 60/39.24
(58) Field of Classification Search .................. 60/39.12, 60/39.182, 39.24, 39.281, 772, 773, 781
See application file for complete search history.

(56) References Cited

U.S. PATENT DOCUMENTS 4,442,665 A * 4/1984 Fick et al. ..................... 60/39.12
4,489,562 A * 12/1984 Snyder et al. .................. 60/667
5,281,129 A * 1/1994 Urushidani et al. ............ 431/12

FOREIGN PATENT DOCUMENTS

| JP | 6-288262 A | 10/1994 |
| JP | 9-96227 A | 4/1997 |
| JP | 10-082330 A | 3/1998 |
| JP | 2000-110508 A | 4/2000 |
| JP | 2000-248908 A | 9/2000 |
| JP | 2000-297610 A | 10/2000 |
| JP | 2000-303804 A | 10/2000 |
| JP | 2002-129910 A | 5/2002 |
| JP | 2006-90287 A | 4/2006 |

OTHER PUBLICATIONS

Japanese Office Action dated Feb. 1, 2011, issued in corresponding Japanese Patent Application No. 2006-303782.
International Search Report of PCT/JP2007/071820, Mailing Date of Jan. 22, 2008.
Notification of the Decision to Grant a Patent Right for Patent for Invention, dated Oct. 10, 2012 issued in corresponding Chinese Patent Application No. 2007-80018184.2, w/English Translation (2 pages).

* cited by examiner

*Primary Examiner* — Phutthiwat Wongwian
(74) *Attorney, Agent, or Firm* — Westerman, Hattori, Daniels & Adrian, LLP

(57) ABSTRACT

An integrated gasification combined cycle that can adjust the balance of pressure/temperature in an overall plant and can stabilize the output of a gas turbine at an early stage during load variation, and an operation control method of the integrated gasification combined cycle are provided. When a calorific abnormality of fuel gas is detected during load variation of a gas turbine (5b), a load change command value of the gas turbine (5b) is set to zero or is decreased, and based on this load change command value, a power generation output command of the gas turbine (5b) is generated.

9 Claims, 14 Drawing Sheets

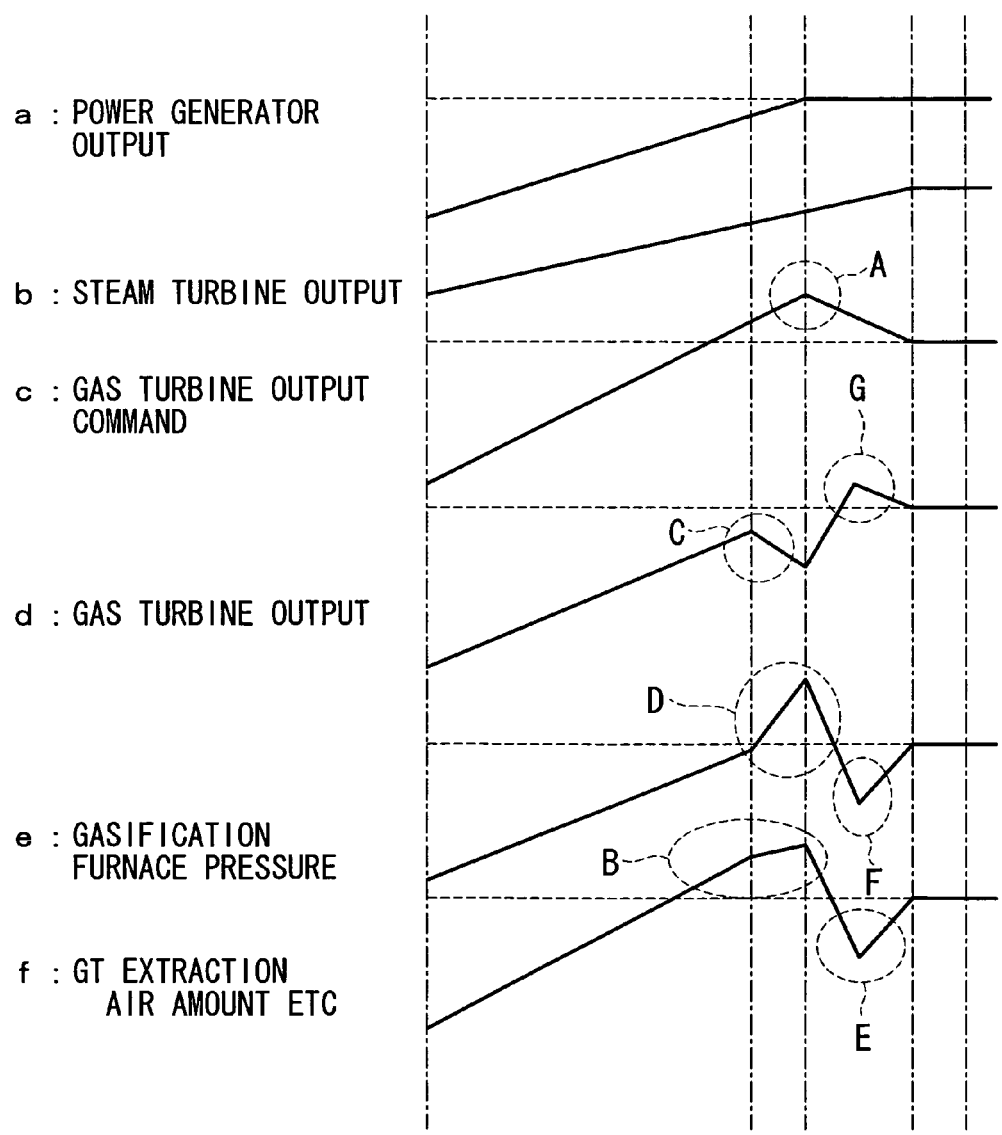

INTEGRATED GASIFICATION COMBINED CYCLE AND OPERATION CONTROL METHOD THEREOF

TECHNICAL FIELD

The present invention relates to an integrated gasification combined cycle and an operation control method thereof.

BACKGROUND ART

Heretofore, an integrated gasification combined cycle (IGCC) that combines a gas turbine facility and a steam turbine facility has been known (for example, see Patent Document 1).

Patent Document 1: Japanese Unexamined Patent Application, Publication No. 2002-129910

DISCLOSURE OF INVENTION

One problem experienced in this IGCC is, for example, output variation of a gas turbine which occurs during load variation, as described below.

In general, the response speed of a steam turbine is low as compared to that of a gas turbine. Hence, as shown in FIG. 14, since the delay in response of the steam turbine is compensated for by the gas turbine during load variation, a gas-turbine output command overshoots (A in FIG. 14). During this overshoot, since a large amount of fuel gas must be supplied to the gas turbine, a large compressor extraction airflow of the gas turbine is necessary as compared to that required during normal operation, as shown by f in FIG. 14, and furthermore, the amount of powdered coal and the like to be charged in a gasification furnace is also increased (B in FIG. 14).

When the compressor extraction airflow of the gas turbine is increased, the pressure of the gasification furnace is not likely to be increased. As a result, in order to maintain a predetermined pressure, in the gasification furnace, a larger amount of air must be supplied, and hence the amount of air supplied to the gas turbine is decreased.

When the amount of air supplied to the gas turbine is decreased, the temperature therein is increased, and as a result, the operation is shifted to a temperature control mode. During this temperature control, in order to maintain an inlet temperature constant, since the output is reduced (C in FIG. 14), the amount of fuel gas flowing from the gasification furnace is decreased, and the pressure therein is concomitantly increased (D in FIG. 14).

Accordingly, in the gasification furnace, in order to lower the increased pressure to the original level, control for decreasing the amount of air supplied to the gasification furnace is performed (E in FIG. 14), and as a result, the pressure in the gasification furnace is decreased (F in FIG. 14).

In addition, concomitant with the decrease in pressure in the gasification furnace, the temperature in the gas turbine is gradually decreased, and when the operation escapes from the temperature control mode, the output of the gas turbine is increased in accordance with the required load (G in FIG. 14).

Since the steps described above are repeatedly performed, the output of the gas turbine is repeatedly varied, and the output converges to an output value in accordance with a gas-turbine output command.

In addition, since the pressure variation or the like occurs in the gasification furnace as described above, the calorific value of fuel gas output from the gasification furnace is also varied, so that a calorific abnormality may occur in some cases. When the calorific abnormality described above occurs, the range of load variation of the gas turbine is further increased, and a problem may arise in that a longer time is necessary to obtain a stable output.

The present invention has been conceived to solve the problems described above, and an object of the present invention is to provide an integrated gasification combined cycle that can adjust the balance of pressure/temperature in an overall plant and, during load variation, that can stabilize the output of a gas turbine at an early stage, and to provide an operation control method of the integrated gasification combined cycle.

In order to achieve the above object, the present invention uses the following solutions.

According to a first aspect of the present invention, there is provided an operation control method of an integrated gasification combined cycle, wherein when a calorific abnormality of fuel gas is detected during load variation of a gas turbine, a load change command value of the gas turbine is set to zero or is decreased, and based on this load change command value, a power generation output command of the gas turbine is generated.

As described above, when a calorific abnormality of fuel gas is detected during load variation of a gas turbine, since the load change command value of the gas turbine is set to zero or is decreased, the amount of fuel gas supplied to a combustor of the gas turbine can be maintained constant or can be decreased. Accordingly, since the flow rate of fuel gas output from a gasification furnace is stabilized, the gasification furnace can be operated so as to obtain a stable state. As a result, the operation of the gasification furnace can be stabilized at an early stage, and hence the calorific value of the fuel gas can be returned to a normal level at an early stage.

In the operation control method of an integrated gasification combined cycle, described above, when the load change command value is decreased, the range of decrease of the load change command value may be determined in accordance with the range of change of the calorific value of the fuel gas.

Accordingly, while an output of the gas turbine at a certain level is obtained, the gasification furnace can be stabilized.

In the above operation control method of an integrated gasification combined cycle, in the case in which the calorific abnormality is not detected when a load change demand of the gas turbine is set to zero or is decreased, the load change command value of the gas turbine may be returned to a normal level.

Accordingly, when the calorific abnormality is not detected, since the load change command value of the gas turbine is returned to a normal level, a desired output can be obtained by a stable operation control.

According to a second aspect of the present invention, there is provided an operation control method of an integrated gasification combined cycle, including: a first step of generating a power generation output command of a gas turbine using a value obtained by subtracting a power generation output of a steam turbine from a power generator output command, and in this method, a gasification furnace is controlled using the power generation output command of the gas turbine obtained in the first step.

As described above, since the power generation output command of the gas turbine is generated using the value obtained by subtracting the power generation output of the steam turbine from the power generator output command, and further the gasification furnace is controlled by using the power generation output command of the gas turbine, the delay of response of the steam turbine can be reflected in the operation control of the gasification furnace. Accordingly, the trackability of the gasification furnace with respect to the load variation can be improved, and by cooperative operation of the gasification furnace and the gas turbine, the output of the gas turbine can be stabilized at an early stage.

In the operation control method of an integrated gasification combined cycle, described above, by using a table or a relational expression in which the power generation output command of the gas turbine and required amounts of elements to be charged into the gasification furnace are related with each other, the required amounts of the elements corresponding to the power generation output command of the gas turbine obtained in the first step may be obtained, and correction amounts corresponding to the range of variation of the power generation output command of the gas turbine or the range of variation of the power generation output of the gas turbine may be added to the obtained required amounts to determine final required amounts of the elements, so that based on the final required amounts, the amounts of the elements to be charged into the gasification furnace are controlled.

As described above, the required amounts of the elements are obtained based on the table or the relational expression, and the correction amounts corresponding to the range of variation of the power generation output command of the gas turbine or the range of variation of the power generation output of the gas turbine are added to the obtained required amounts, so that the final required amounts of the elements are determined; hence, in accordance with the operating conditions of the gas turbine, the operation of the gasification furnace can be further enhanced.

Accordingly, the operation of the gas turbine can be further stabilized.

In the operation control method of an integrated gasification combined cycle, described above, while the gas turbine is in a temperature control state, the load change command value of the gas turbine may be set to zero or may be decreased, and the power generation output command of the gas turbine may be generated based on the load change command value.

During temperature control, since the load change demand of the gas turbine is set to zero or is decreased, the operating conditions of the gas turbine can be controlled so as to obtain a stable state. Accordingly, the gas turbine can escape from the temperature control state at an early stage and can return to a normal operation mode, that is, an operation mode in accordance with the load, at an early stage.

In the operation control method of an integrated gasification combined cycle, described above, while the gas turbine is in a temperature control state, the gasification furnace may be controlled by using the power generation output of the gas turbine instead of the power generation output command of the gas turbine.

During temperature control, regardless of the load, the control is performed so as to maintain an inlet temperature of the gas turbine constant. On the other hand, the gasification furnace is controlled based on the output command of the gas turbine. Accordingly, the operation of the gas turbine and that of the gasification furnace are controlled based on parameters which are completely independent of each other. Hence, the balance of temperature, pressure, and the like in a plant may be disrupted with high probability. On the other hand, according to the present invention, during temperature control, the actual output of the gas turbine is fed back to the gasification furnace so that the operation thereof is controlled; hence, cooperative operation of the gas turbine and the gasification furnace can be performed. Accordingly, since the balance of temperature, pressure, and the like in the plant can be maintained, even during temperature control, the operation control can be stably performed.

According to a third aspect of the present invention, there is provided an integrated gasification combined cycle in which when a calorific abnormality of fuel gas is detected during load variation of a gas turbine, a load change command value of the gas turbine is set to zero or is decreased, and based on this load change command value, a power generation output command of the gas turbine is generated.

According to a fourth aspect of the present invention, there is provided an integrated gasification combined cycle in which a power generation output command of a gas turbine is generated using a value obtained by subtracting a power generation output of a steam turbine from a power generator output command, and in which a gasification furnace is controlled using the generated power generation output command of the gas turbine.

In addition, the above aspects may be used in combination whenever possible.

The present invention provides advantages in that the balance of pressure/temperature in an overall plant can be adjusted and, during load variation, the output of the gas turbine can be stabilized at an early stage.

BRIEF DESCRIPTION OF DRAWINGS

FIG. 14 is a view illustrating the principle of output variation of a gas turbine during load variation.

EXPLANATION OF REFERENCE SIGNS

Figure 1:
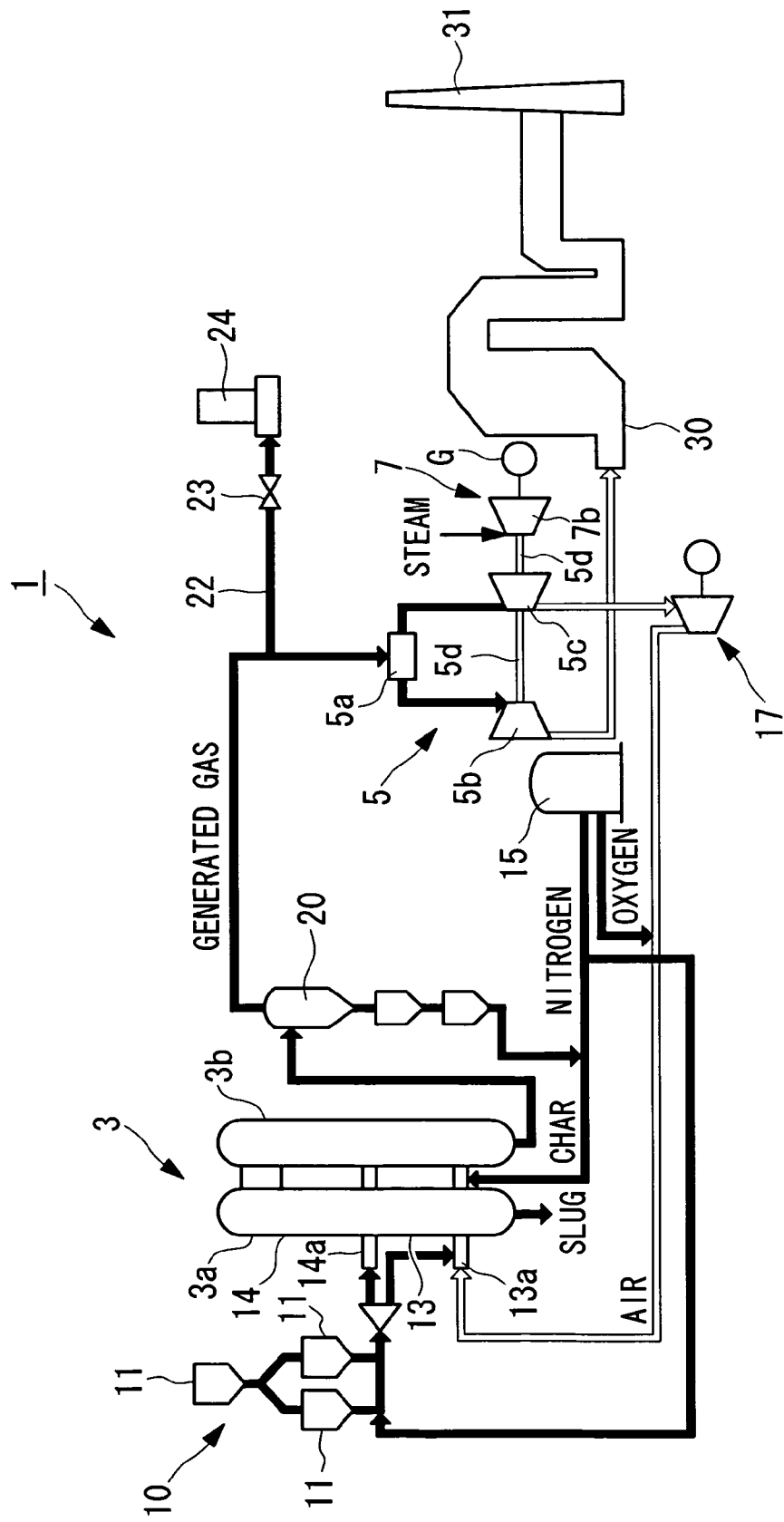
FIG. 1 is a view showing a schematic structure of an overall IGCC according to a first embodiment of the present invention.

1 integrated gasification combined cycle
3 gasification furnace
5 gas turbine facility
5*a* combustor 5b gas turbine
20 char recovery apparatus
50 gasification furnace control apparatus
70 turbine control apparatus
G power generator

BEST MODE FOR CARRYING OUT THE
INVENTION

First Embodiment

Hereinafter, an integrated gasification combined cycle (hereinafter referred to as "IGCC") and a control operation method thereof, according to a first embodiment of the present invention, will be described with reference to the drawings.

FIG. 1 is a view showing a schematic structure of the overall IGCC according to this embodiment.

As shown in FIG. 1, an IGCC 1 according to this embodiment primarily includes a gasification furnace 3, a gas turbine facility 5, a steam turbine facility 7, and an exhaust heat recovery boiler (HRSG) 30.

At the upstream side of the gasification furnace 3, a coal supply facility 10 for supplying powdered coal to the gasification furnace 3 is provided. This coal supply facility 10 includes a pulverizer (not shown) which pulverizes coking coal into powdered coal of several to several hundreds of micrometers, and the powdered coal pulverized by this pulverizer is stored in a plurality of hoppers 11.

The powdered coal stored in the hoppers 11 is transported, a fixed amount at a time, to the gasification furnace 3 together with nitrogen supplied from an air separation apparatus 15.

The gasification furnace 3 includes a coal gasification unit 3a in which gas flows from a lower side to an upper side and a heat exchange unit 3b which is connected to a downstream side of the coal gasification unit 3a and in which gas flows from an upper side to a lower side.

In the coal gasification unit 3a, a combustor 13 and a reductor 14 are provided in this order from a lower side. The combustor 13 is a unit in which powdered coal and char are partly combusted, and in which the remaining is pyrolyzed to discharge volatile components (CO, $H_2$, and lower hydrocarbons). In the combustor 13, an entrained bed is used. However, a fluidized bed or a fixed bed may also be used.

The combustor 13 and the reductor 14 are provided with a combustor burner 13a and a reductor burner 14a, respectively, and powdered coal is supplied to the burners 13a and 14a from the coal supply facility 10.

It is designed that air is supplied to the combustor burner 13a as a gasification agent from an extraction air pressure increasing device 17 together with oxygen separated by the air separation apparatus 15. As described above, the combustor burner 13a is designed such that air containing oxygen at an adjusted concentration is supplied thereto.

In the reductor 14, powdered coal is gasified by high-temperature combustion gases from the combustor 13. Accordingly, flammable gases used as a gas fuel, such as CO and $H_2$, are generated from coal. A coal gasification reaction is an endothermic reaction in which powdered coal and carbon in char react with $CO_2$ and $H_2O$ in a high-temperature gas to generate CO and $H_2$.

In the heat exchanger unit 3b of the gasification furnace 3, a plurality of heat exchangers (not shown) is disposed and is designed to generate steam by obtaining sensible heat from a gas supplied from the reductor 14. Steam generated in the heat exchangers is primarily used as drive steam for driving a steam turbine 7b. Gas passing through the heat exchanger unit 3b is introduced into a char recovery apparatus 20. This char recovery apparatus 20 includes a porous filter and traps char mixed in the gas for recovery by making it pass through the porous filter. The char thus trapped is deposited in the porous filter to form a char layer. In the char layer, Na and K components contained in the gas are condensed, and as a result, the Na and K components are also removed in the char recovery apparatus 20.

The char thus recovered is returned to the combustor burner 13a of the gasification furnace 3 together with nitrogen separated in the air separation apparatus 15 for recycling. In addition, the Na and K components returned to the combustor burner 13a together with char are finally discharged from a lower side of the coal gasification unit 3a together with molten ash of powdered coal. The molten ash thus discharged is quenched with water and is pulverized to form glassy slugs.

Gas passing through the char recovery apparatus 20 is supplied as fuel gas to a combustor 5a of the gas turbine facility 5.

Between the char recovery apparatus 20 and the combustor 5a of the gas turbine facility 5, a branched path 22 is provided, and a gas purification facility 24 is provided downstream of this branched path 22. The gas purification facility is a facility performing dust removal and desulfurization.

The gas turbine facility 5 includes the combustor 5a in which a gasified fuel is combusted, a gas turbine 5b driven by a combusted gas, and a turbo compressor 5c supplying high-pressure air to the combustor 5a. The gas turbine 5b and the turbo compressor 5c are connected to each other by the same rotary shaft 5d. Air compressed by the turbo compressor 5c is also supplied to the air pressure increasing device 17 as well as to the combustor 5a.

A combusted exhaust gas passing through the gas turbine 5b is introduced into the exhaust heat recovery boiler 30.

The steam turbine 7b of the steam turbine facility 7 is connected to the same rotary shaft 5d of the gas turbine facility 5, so that a so-called single-shaft type combined system is formed. High-pressure steam is supplied to the steam turbine 7b from the gasification furnace 3 and the exhaust heat recovery boiler 30. In addition, besides the single-shaft type combined system, a multi-shaft type combined system may also be used.

A power generator G which outputs electricity using the rotary shaft 5d driven by the gas turbine 5b and the steam turbine 7b is provided at a side opposite to that of the gas turbine facility 5 with the steam turbine facility 7 interposed therebetween. In addition, the position of the power generator G is not limited to that described above and may be provided at any place as long as an electric output can be performed using the rotary shaft 5d.

The exhaust heat recovery boiler 30 generates steam using a combusted exhaust gas from the gas turbine 5b and also discharges the combusted exhaust gas to the atmosphere from a chimney 35.

Next, the operation of the integrated gasification combined cycle 1 having the above structure will be described.

The coking coal is pulverized by the pulverizer (not shown) and is then fed to the hoppers 11 for storage. The powdered coal stored in the hoppers 11 is supplied to the reductor burner 14a and the combustor burner 13a together with nitrogen separated in the air separation apparatus 15. Furthermore, besides powdered coal, char recovered in the char recovery apparatus 20 is also supplied to the combustor burner 13a.

As a combustion gas of the combustor burner 13a, air is used which is formed by adding oxygen separated in the air separation unit 15 to compressed air obtained by further increasing the pressure of compressed air extracted from the turbo compressor 5c of the gas turbine facility 5 using the extraction air pressure increasing device 17. In the combustor 13, powdered coal and char are partly combusted by combustion air, and the remaining is pyrolyzed into volatile components (CO, $H_2$, and lower hydrocarbons).

In the reductor 14, powdered coal supplied from the reductor burner 14a and char from which volatile components are discharged in the combustor 13 are gasified by a high-temperature gas flowing up from the combustor 13, so that flammable gases, such as CO and $H_2$, are generated.

Gas passing through the reductor 14 supplies its sensible heat to the heat exchangers while passing through the heat exchanger unit 3b of the gasification furnace 3, so that steam is generated. The steam generated in the heat exchanger unit 3b is primarily used to drive the steam turbine 7b.

Gas passing through the heat exchanger unit 3b is introduced into the char recovery apparatus 20, so that char is recovered. Na and K components in the gas are condensed in this step and are incorporated in the char. The char incorporating the Na and K components is returned to the gasification furnace 3.

Gas passing through the char recovery apparatus 20 is introduced into the combustor 5a of the gas turbine facility 5 and is then combusted together with compressed air supplied from the turbo compressor 5c. The gas turbine 5b is rotated by this combusted gas, and the rotation shaft is driven.

A combusted exhaust gas passing through the gas turbine 5b is introduced into the exhaust heat recovery boiler 30, and by using the sensible heat of this combusted exhaust gas, steam is generated. The steam generated in the exhaust heat recovery boiler 30 is primarily used to drive the steam turbine 7b.

The steam turbine 7b is rotated by the steam from the gasification furnace 3 and the steam from the exhaust heat recovery boiler 30 and drives the rotary shaft which is also used for the gas turbine facility 5. A rotation force of the rotary shaft is converted into an electric output by the power generator G.

Next, the control of the gasification furnace 3 of the above-described IGCC will be described with reference to FIGS. 2 and 3.

Figure 2:
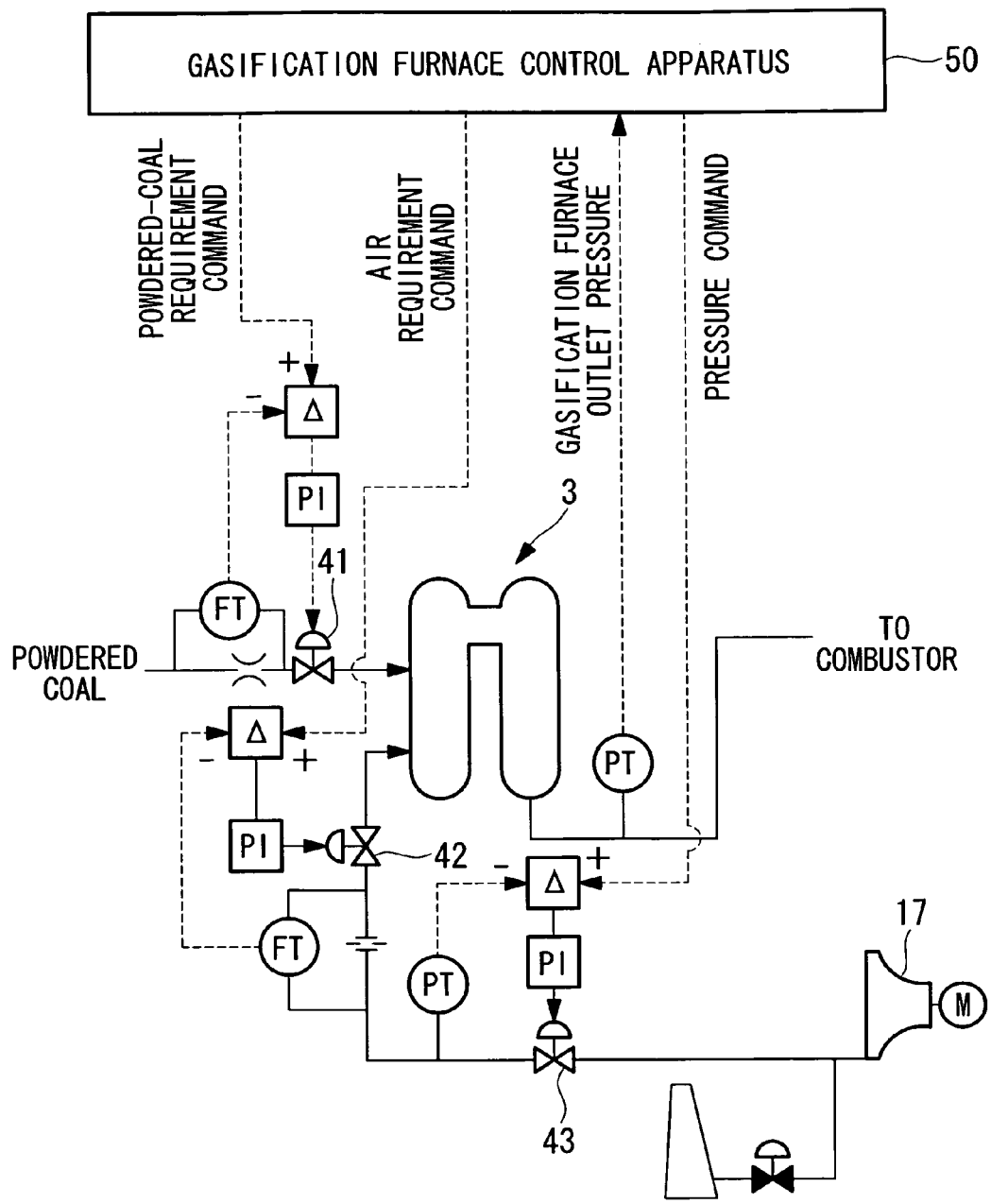
FIG. 2 is a view showing major constituent elements relating to the control of a gasification furnace.

FIG. 2 is a view showing primary constituent elements relating to the control of the gasification furnace.

As shown in FIG. 2, in a supply pipe for supplying powdered coal to the gasification furnace 3 from the coal supply facility 10, a powdered-coal flow rate control valve 41 is provided to adjust the amount of powdered coal to be charged in the gasification furnace 3. In addition, in an air pipe for introducing air into the gasification furnace from the extraction air pressure increasing device 17, an airflow rate control valve 42 is provided to adjust the amount of air to be supplied to the gasification furnace. Furthermore, in this air pipe, a pressure control valve 43 to adjust the pressure is provided.

The valve openings of the powdered-coal flow rate control valve 41, the airflow rate control valve 42, and the pressure control valve 43 are controlled by a powdered-coal requirement command, an air requirement command, and a pressure command, respectively, which are output from a gasification furnace control apparatus 50. In addition, in a fuel pipe for introducing fuel gas generated in the gasification furnace 3 into the combustor 5a of the gas turbine facility 5, a pressure sensor 44 for measuring a gasification furnace outlet pressure is provided in the vicinity of the outlet of the gasification furnace. A value measured by this pressure sensor 44 is output to the gasification furnace control apparatus 50.

Figure 3:
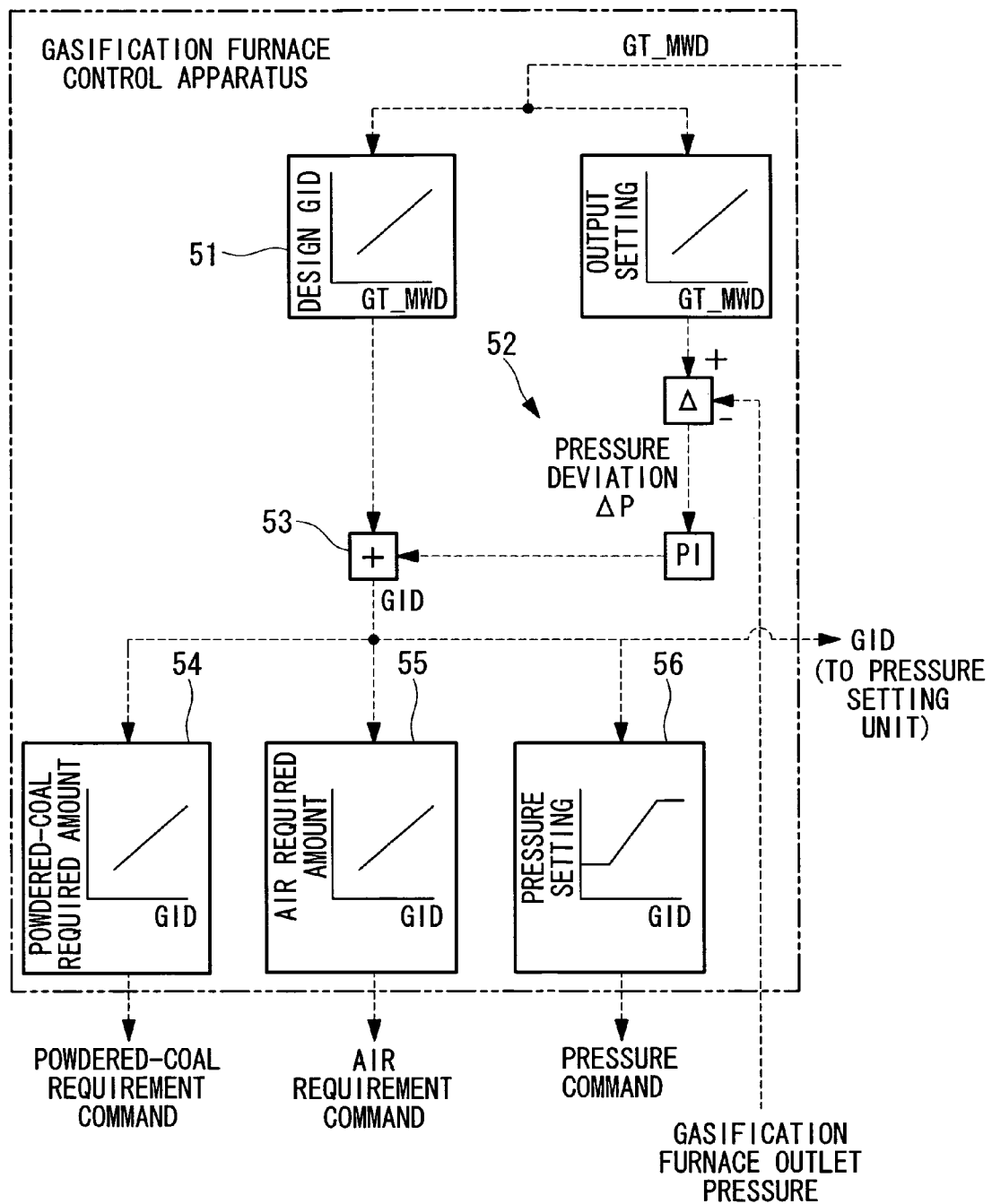
FIG. 3 is a block diagram showing a schematic structure of a gasification furnace control apparatus 50.

FIG. 3 is a block diagram showing a schematic structure of the gasification furnace control apparatus 50.

As shown in FIG. 3, it is designed that a gas turbine output command GT_MWD obtained in a turbine control apparatus 70 described later is input to the gasification furnace control apparatus 50. In the gasification furnace control apparatus 50, this gas turbine command GT_MWD is given to a design GID (gasification furnace total command value) setting unit 51 and a correction value calculation unit 52.

The design GID setting unit 51 sets a design GID in order to perform preliminary control of the gasification furnace 3 according to the load of the gas turbine 5b. The design GID setting unit 51 includes, for example, a table or a relational expression in which the gas turbine output command GT_MWD and the design GID are related with each other, and by using this table or the relational expression, the design GID corresponding to the gas turbine output command GT_MWD from the turbine control apparatus 70 is obtained.

The correction value calculation unit 52 obtains a correction value to correct the above design GID from the relationship, for example, between the gas turbine output command GT_MWD and the gasification furnace outlet pressure.

In particular, the correction value calculation unit 52 has a table or a relational expression in which the gas turbine output command GT_MWD and an outlet pressure command value of the gasification furnace 3 are related with each other, and after a pressure command value corresponding to the gas turbine output command GT_MWD from the turbine control apparatus 70 is obtained by using this table or the relational expression, the deviation (hereinafter referred to as "pressure deviation $\Delta P$") between this pressure command value and the actual gasification furnace outlet pressure is obtained, so that a value obtained by performing proportional-integral control on this pressure deviation $\Delta P$ is output as a correction value.

In addition, in an adder 53, the design GID set by the above design GID setting unit 51 and the correction value obtained by the correction value calculation unit 52 are added to each other, and this added value is output as the gasification furnace total command value GID to a powdered-coal required amount setting unit 54, an air required amount setting unit 55, and a pressure setting unit 56.

The setting units 54 to 56 have respective tables or computational formulas in which the gasification furnace total correction value GID is related with the required amounts of powdered coal, air, and pressure, respectively. By using the tables or the computational formulas, the respective required amounts corresponding to the gasification furnace total command value GID are obtained, and commands corresponding to the respective required amounts are generated. These commands are output to the units shown in FIG. 2 as the powdered-coal requirement command, the air requirement command, and the pressure command and are used as control values controlling the amount of powdered coal charged into the gasification furnace 3, the amount of air supplied thereto, and the gasification furnace outlet pressure, respectively.

In addition, although the above three setting units are shown in FIG. 3, besides the above setting units, setting units to set the amounts of oxygen and char to be charged may also be provided.

In addition, the above gasification furnace total command value GID obtained in the gasification furnace control apparatus 50 is given to the turbine control apparatus 70 described later and is used as one of a number of important parameters also in the gas turbine facility 5.

Next, the control of the gas turbine facility 5 shown in FIG. 1 will be described with reference to FIGS. 4 and 5.

Figure 4:
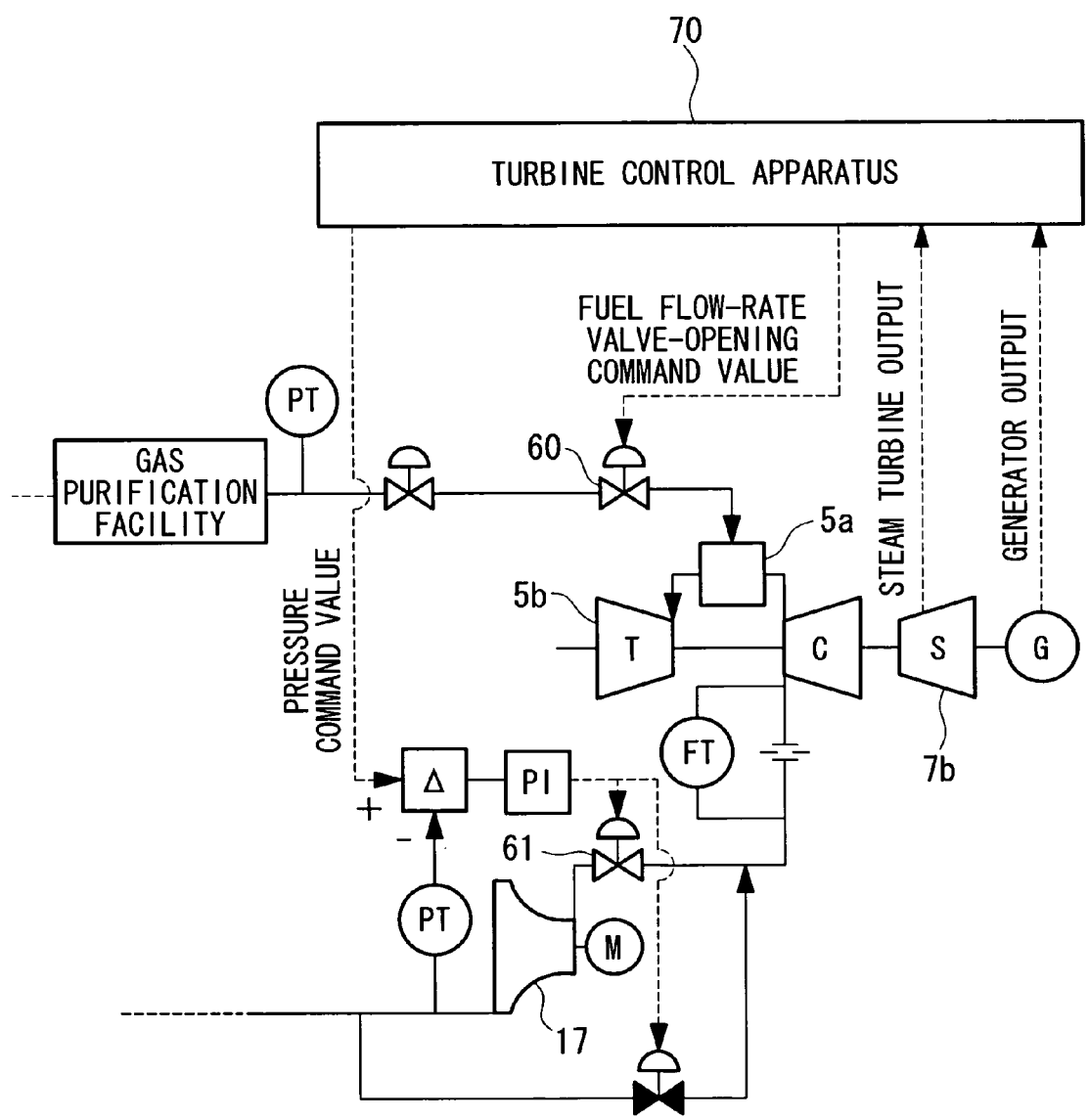
FIG. 4 is a view showing a primary structure relating to the control of a gas turbine facility 5.

FIG. 4 is a view showing a primary structure relating to the control of the gas turbine facility 5.

As shown in FIG. 4, in a fuel pipe for supplying fuel gas to the combustor 5a, a fuel flow rate adjustment valve 60 adjusting a fuel flow rate is provided. The opening of this fuel flow rate adjustment valve 60 is controlled by the turbine control apparatus 70. In an air pipe for supplying air to the turbo compressor 5c, an airflow rate adjustment valve (hereinafter referred to as "IGV adjustment valve") 61 adjusting an airflow rate is provided. The opening of this IGV adjustment valve 61 is adjusted by the turbine control apparatus 70.

In the vicinity of the gas turbine 5b, a BPT sensor (not shown) measuring an exhaust gas temperature (hereinafter referred to as "blade path temperature") of the gas turbine 5b is provided. In addition, at a position further downstream in an exhaust gas flow path in which the BPT sensor is provided, an EXT sensor (not shown) measuring an exhaust gas temperature at an exhaust duct (hereinafter referred to as "exhaust gas temperature") is provided. For example, thermocouples are used as the above sensors. The temperatures measured by the BPT sensor and the EXT sensor are output to the turbine control apparatus 70.

In addition, the output of the steam turbine 7b and the output of the power generator G are given to the turbine control apparatus 70. The output of the steam turbine 7b may be obtained, for example, by calculation from the inlet state quantity of the steam turbine 7b.

The turbine control apparatus 70 obtains the state quantities relating to the operating conditions and the temperature condition of the gas turbine as input signals, and based on these input signals, a fuel flow-rate valve-opening command value controlling a fuel flow rate supplied to the combustor 5a, a pressure command value controlling a suction pressure of the extraction air pressure increasing device 17, and the like are determined. As the state quantity relating to the above operating conditions, for example, the output of the power generator G, the output of the steam turbine 7b, and the rotation speed or the number of rotations of the gas turbine 5b may be mentioned by way of example. In addition, as the state quantity relating to the temperature condition, for example, an exhaust gas temperature, a blade path temperature, or the like may be mentioned by way of example.

Figure 5:
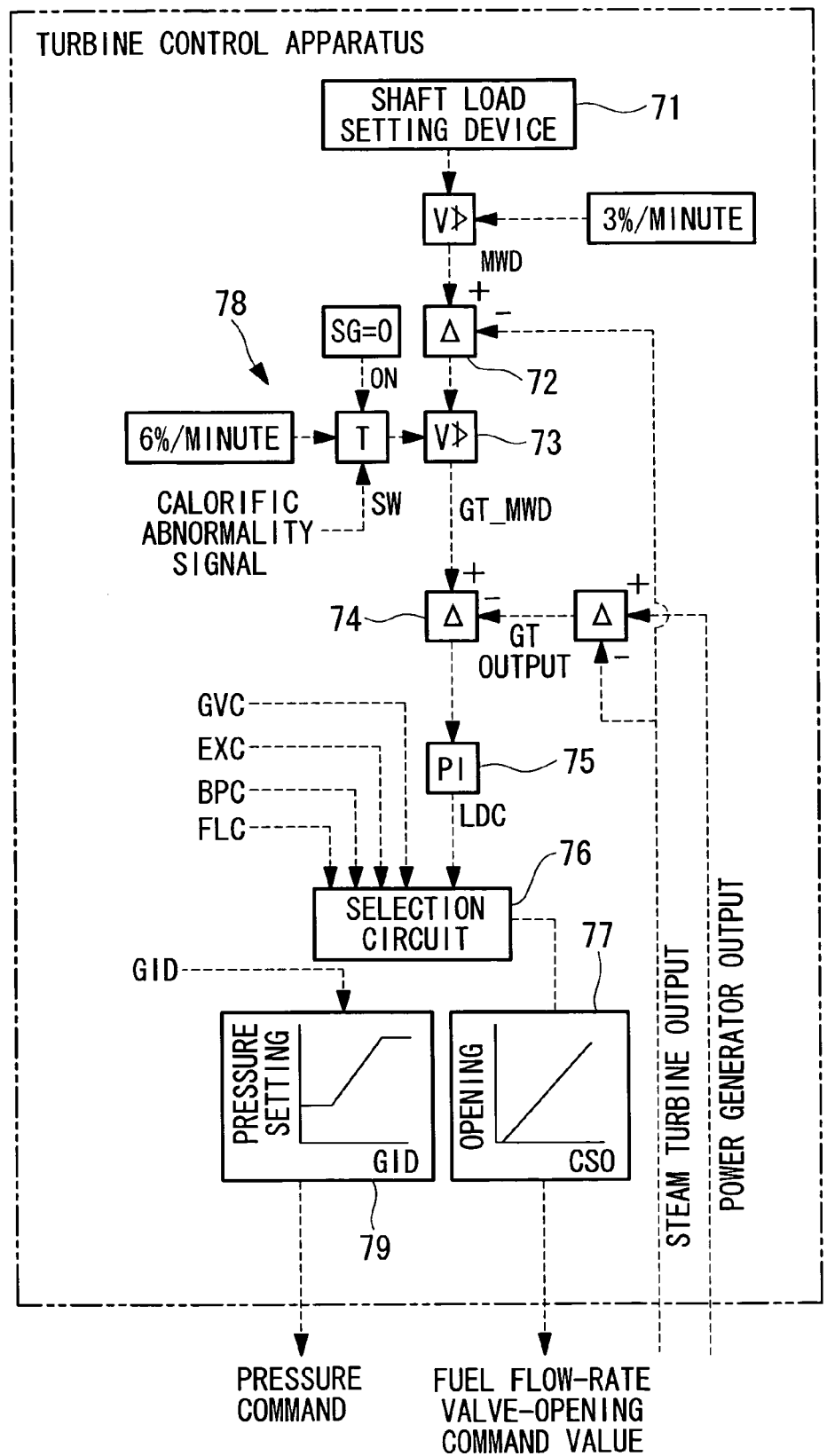
FIG. 5 is a block diagram showing a schematic structure of a turbine control apparatus 70.

FIG. 5 is a block diagram showing a schematic structure of the turbine control apparatus 70.

First, when a target load of a power generator output is set by a shaft load setting device 71, a power generator command MWD is set so that the load is changed to this target load at a plant load change rate (3% per minute). This power generator command MWD is subtracted by the output of the steam turbine by a subtracter 72 and is then input to a rate limiting unit 73 as a primary output command of the gas turbine.

The rate limiting unit 73 adjusts the primary output command of the gas turbine so as not to exceed the change rate (load change command value) set by the rate setting unit 78 and outputs a final gas turbine output command (power generation output command of the gas turbine) GT_MWD.

The rate setting unit 78 sets the change rate to 6% per minute when the calorific value of fuel gas is normal and sets it to zero when the calorific value of the fuel gas is abnormal.

Accordingly, while the calorific value of the fuel gas is detected as abnormal, since the change rate of the gas turbine output command is set to zero, the gas turbine output command GT_MWD during this period is prevented from changing and can be made constant.

The gas turbine output command GT_MWD output from the rate limiting unit 73 is input to a subtracter 74 so that the difference from the output of the gas turbine is calculated, and PI control using a PI controller 75 is further performed, so that a control command value LDC based on the required load is output to a selection circuit 76.

For example, a temperature control command value EXC and BPC calculated based on the temperature, and a governor control command value GVC calculated based on a governor pressure are input to the selection circuit 76. The selection circuit 76 selects the lowest value among the control command values described above and outputs it to a valve opening setting unit 77 as a control command value CSO. The valve opening setting unit 77 is provided in advance with a table or a relational expression in which the valve opening and the control command value CSO are related with each other. The valve opening setting unit 77 obtains an opening corresponding to the control command value CSO input from the selection circuit 76 using the table or the relational expression and outputs this valve opening as the fuel flow-rate valve-opening command value.

In addition, the gasification furnace total command value GID obtained in the above gasification furnace control apparatus 50 is given to a pressure setting unit 79 setting a suction pressure of the extraction air pressure increasing device 17. The pressure setting unit 79 has a table or a computational formula in which the gasification furnace total command value GID and a pressure set value are related with each other, and by using this table or the computational formula, a pressure set value corresponding to the gasification furnace command value GID from the gasification furnace control apparatus 50 is obtained, so that a pressure command corresponding to this set value is generated. This pressure command is used as a control value determining the opening of the IGV adjustment valve 61 shown in FIG. 4.

Next, the operation of the gasification furnace control apparatus 50 and that of the turbine control apparatus 70 when a fuel gas abnormality occurs will be described.

When the fuel gas abnormality occurs, the change rate is set to zero by the change rate setting unit 78. Hence, the gas turbine output command GT_MWD output from the rate limiting unit 73 is maintained at a constant value.

Accordingly, since the control command value CSO selected by the selection circuit 76 is made constant at the same value as described above, the opening of a fuel flow rate valve is maintained, so that the fuel flow rate supplied to the combustor 5a is made constant. As a result, since the gas flow rate flowing from the gasification furnace 3 can be stabilized, the gasification furnace 3 can be placed in the state in which the operation thereof can be easily stabilized. Furthermore, in the gasification furnace 3, since the amounts of the respective elements, such as powdered coal, air, and char, which are to be charged into the gasification furnace 3 are adjusted based on the gas turbine output command GT_MWD which is maintained constant, the operation state of the gas turbine can be reflected in the operation of the gasification furnace 3.

As described above, according to the IGCC and the operation control method thereof in this embodiment, when a calorific abnormality of fuel gas occurs, since the gas turbine output command GT_MWD is made constant, the fuel gas supply amount can be made constant, and the conditions of the gasification furnace 3, such as the pressure, temperature, and calorific value of fuel gas, can be stabilized at an early stage. Hence, the calorific value of fuel gas supplied to the combustor 5a can be returned to a normal level at an early stage, and the operation of the gas turbine can be stabilized at an early stage.

Furthermore, according to the IGCC and the operation control method thereof in this embodiment, since the gas turbine output command GT_MWD is set by subtracting the actual output of the steam turbine from the power generator command MWD, the delay in response by the steam turbine 7a can be reflected in the gas turbine output command GT_MWD. In addition, since the control of the gasification furnace 3 is performed based on the gas turbine output command GT_MWD in which the delay in response of the steam turbine is reflected, the delay in response of the steam turbine 7a can be reflected in the control of the gasification furnace 3, so that the responsiveness of the gasification furnace 3 can be improved.

Figure 6:
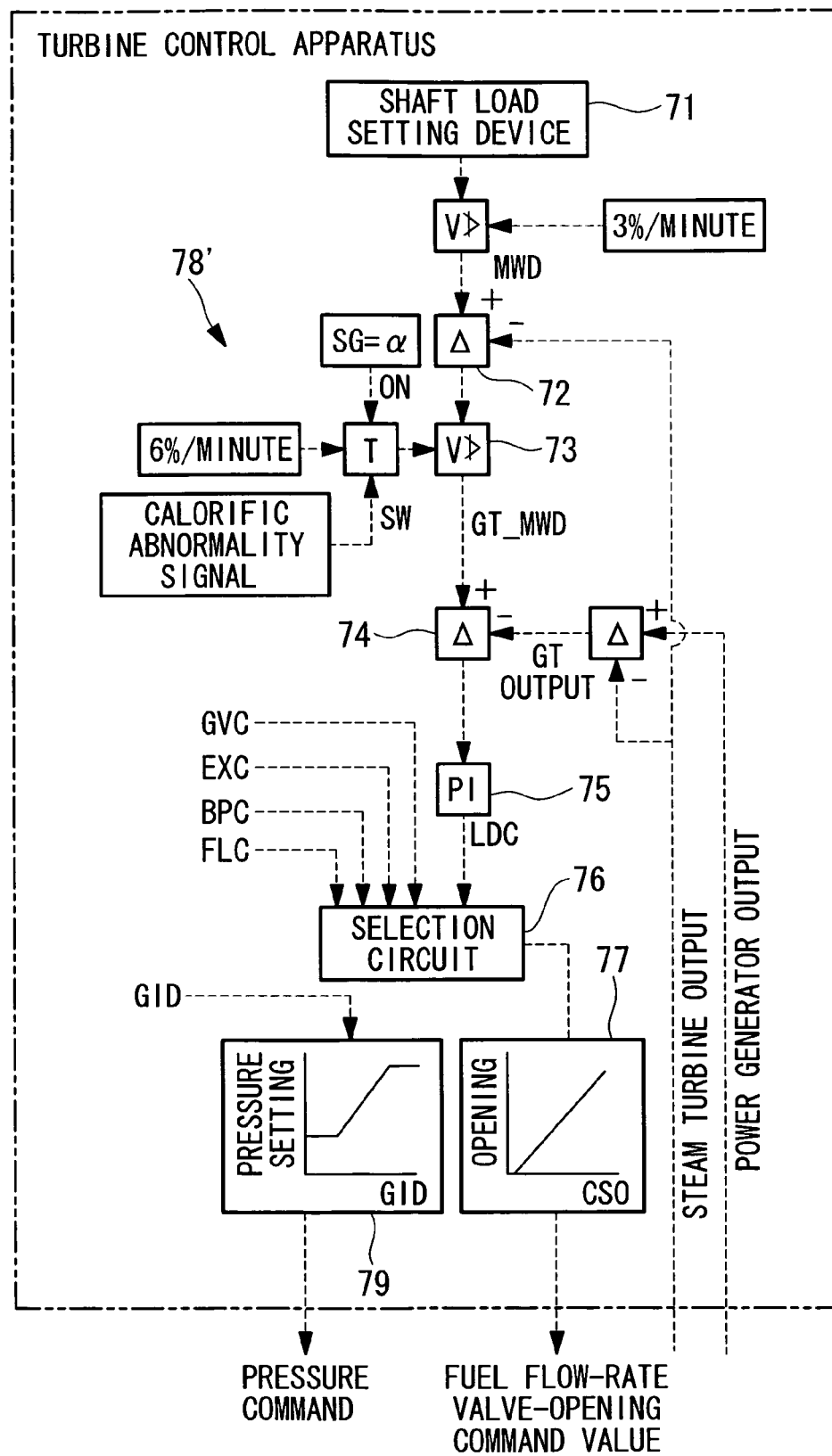
FIG. 6 is a block diagram showing a modification of a turbine control apparatus.

In addition, in this embodiment, although the change rate of the power generation command of the gas turbine is set to zero when the calorific abnormality occurs, instead of the above, as shown in FIG. 6, the change rate of the gas turbine output command GT_MWD may be set to a change rate α lower than the normal change rate (6% per minute in the above case) so as to decrease the change rate of the gas turbine output command GT_MWD to less than the normal change rate.

In addition, also in this case, the change rate may be set in accordance with the range of change of the calorific value of the fuel gas. In particular, as the range of change of the calorific value is increased, the change rate is preferably decreased. As described above, when the change rate is set in accordance with the range of change of the calorific value of the fuel gas, precise control can be realized in accordance with the calorific condition.

Second Embodiment

Next, an IGCC and an operation control method thereof according to a second embodiment of the present invention will be described.

When a calorific abnormality of fuel gas is detected in the above first embodiment, the change rate setting unit 78 sets the change rate of the gas turbine output command GT_MWD to zero.

Figure 7:
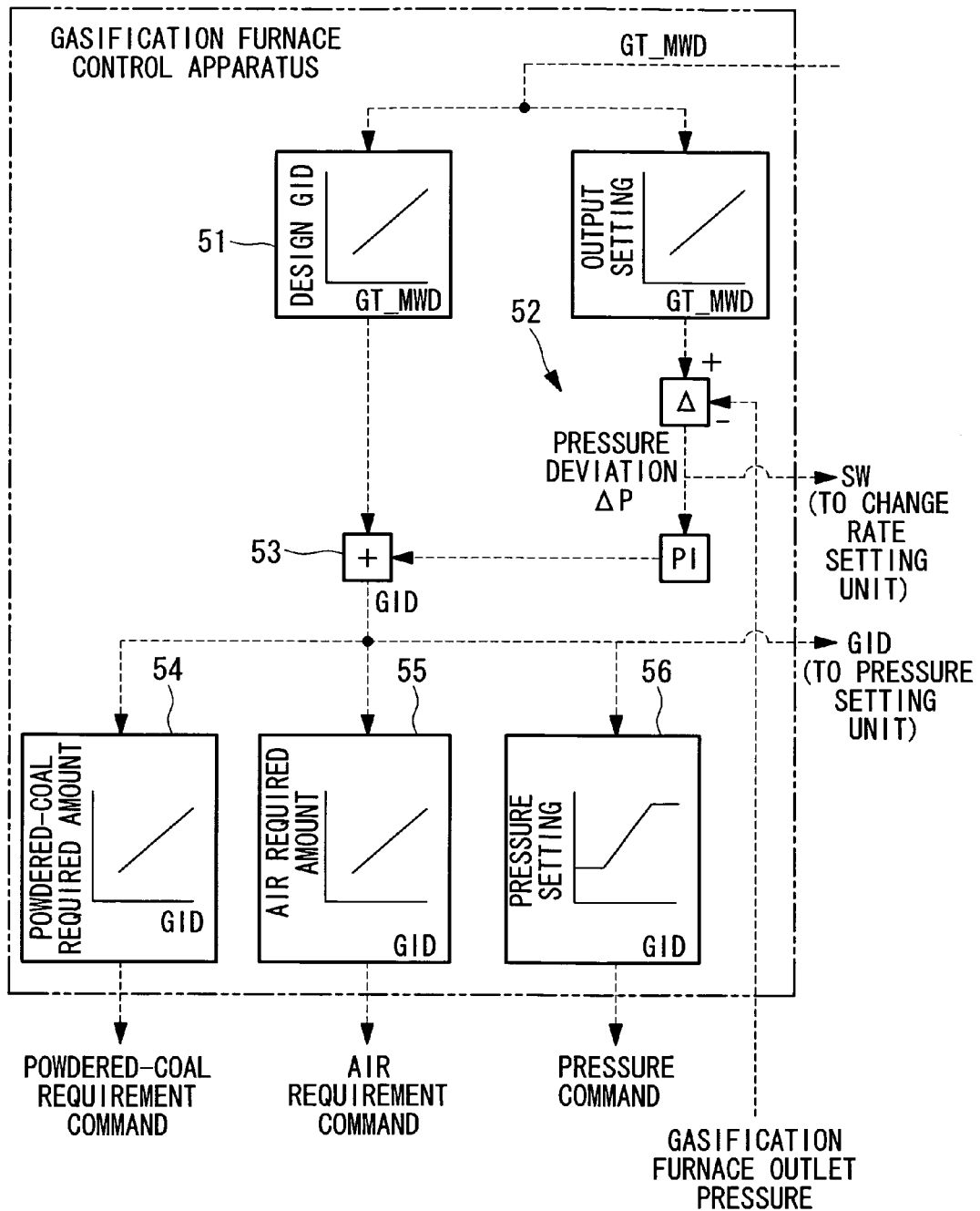
FIG. 7 is a block diagram showing a schematic structure of a gasification furnace control apparatus according to a second embodiment of the present invention.
Figure 8:
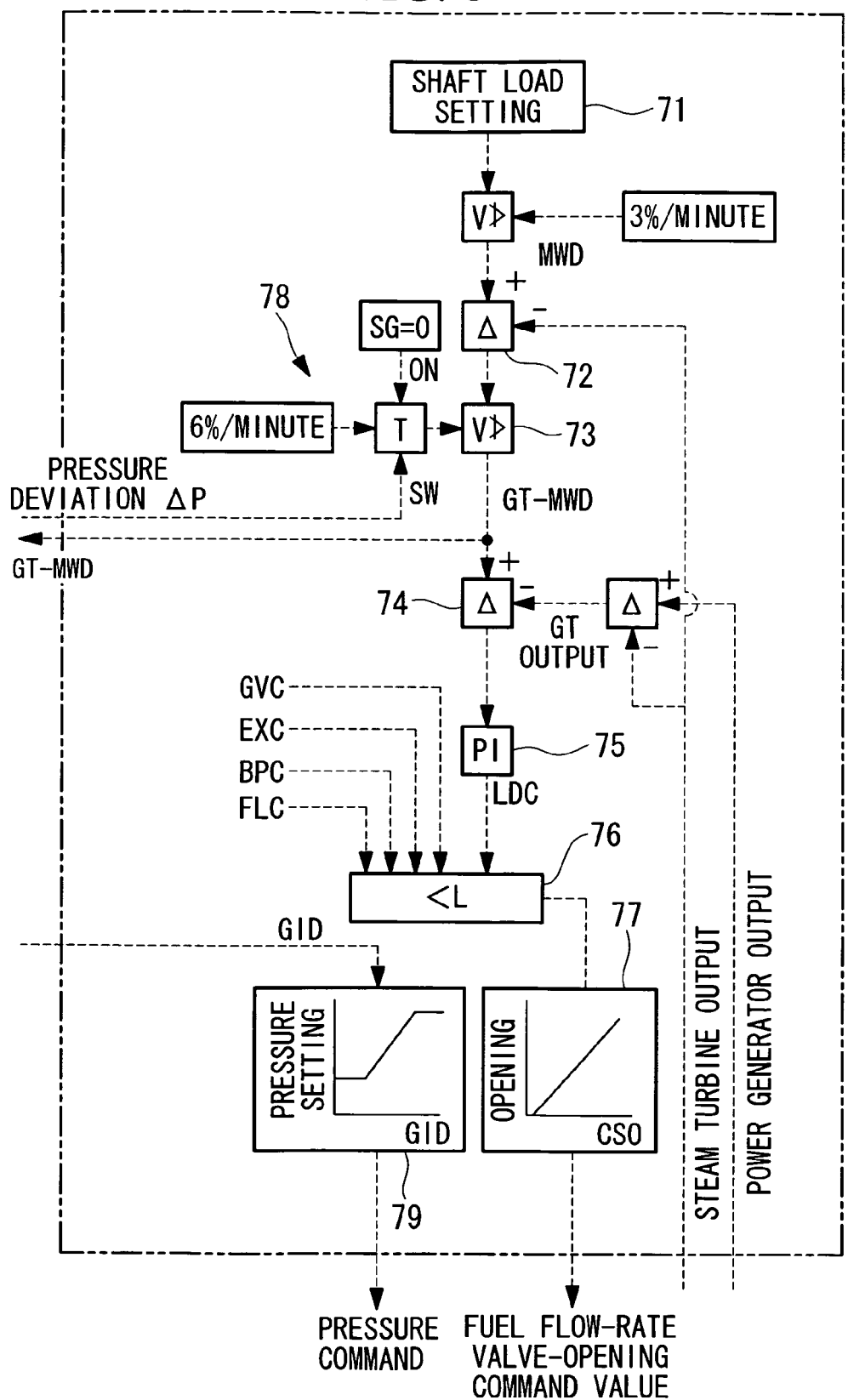
FIG. 8 is a block diagram showing a schematic structure of a turbine control apparatus according to the second embodiment of the present invention.

In this embodiment, as shown in FIG. 7, a pressure deviation ΔP obtained in the gasification furnace control apparatus 50, that is, the difference between the pressure command value set based on the gas turbine output command GT_MWD and the actual gasification furnace outlet pressure, is given to the change rate setting unit 78 of the gas turbine control apparatus 70, as shown in FIG. 8, and when the pressure deviation ΔP is larger than a standard value, the change rate setting unit 77 sets the change rate to zero.

With the structure described above, when the deviation between the gasification furnace outlet pressure and the pressure command value is larger than the standard value, the pressure abnormality is detected, and the gas turbine output command GT_MWD is rapidly made constant; hence, the control of the gasification furnace 3 can be stabilized at an early stage. As a result, the gasification furnace outlet pressure can be made close to a normal value at an early stage, and a normal state can be rapidly recovered.

Besides the case in which the change rate is set to zero, as described above, the range of decrease in change rate may be changed in accordance with the pressure deviation ΔP. For example, as the pressure deviation ΔP is increased, the change rate may be decreased.

Third Embodiment

Next, an IGCC and an operation control method thereof according to a third embodiment of the present invention will be described.

Figure 9:
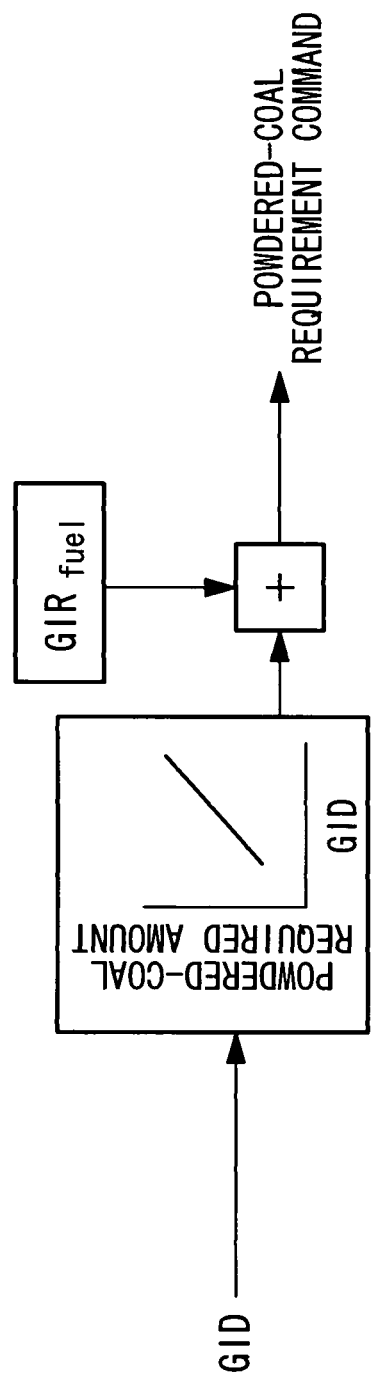
FIG. 9 is a view illustrating a method for setting a powdered-coal requirement command according to a third embodiment of the present invention.

In the IGCC according to this embodiment, as shown in FIG. 9, the method for generating the powdered-coal requirement command and the method for generating the air requirement command in the gasification furnace control apparatus 50 are different from those of the first embodiment.

Hereinafter, differences from the first embodiment will be primarily described.

As shown in FIG. 9, in this embodiment, as in the first embodiment, by using a table in which GID and a powdered-coal required amount are related with each other, a coal required amount is first obtained, and by adding a coal acceleration command $GIR_{fuel}$ enhancing the operating conditions of the gasification furnace 3 to this coal required amount, a final powdered-coal requirement command is generated. In this case, the coal acceleration command $GIR_{fuel}$ is a control value which is set based on the output command GT_MWD of the gas turbine or the output thereof.

Figure 10:
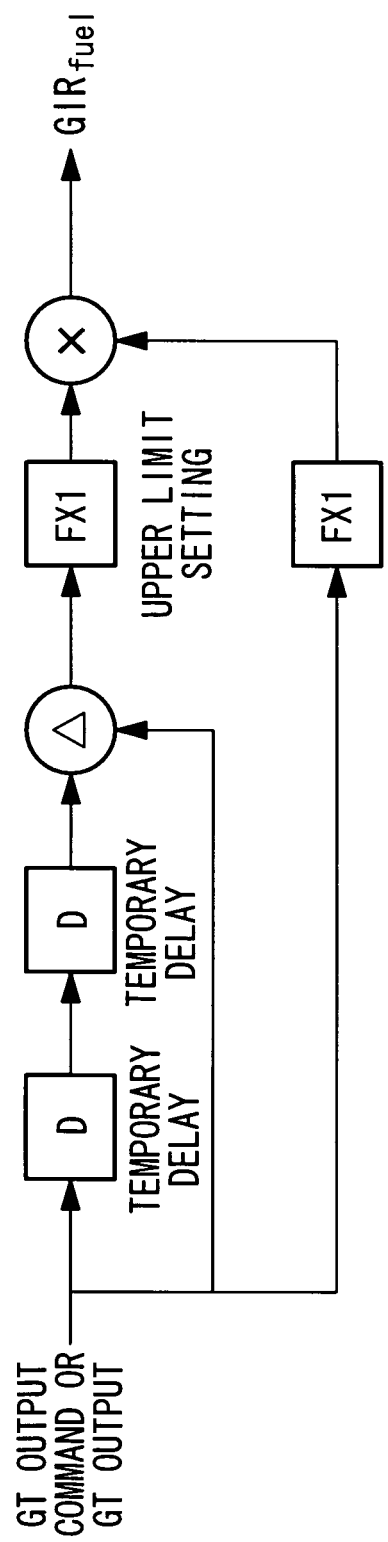
FIG. 10 is a view illustrating one example of a calculation procedure of a powdered-coal acceleration command.

For example, the coal acceleration command $GIR_{fuel}$ is obtained by the structure as shown in FIG. 10. As shown in FIG. 10, after the output command GT_MWD of the gas turbine or the output of the gas turbine is received as input information, an upper limit change value of the coal required amount is obtained from the differential rate of change of the input information and a predetermined equation FX1, and the coal acceleration command $GIR_{fuel}$ is obtained by multiplying the upper limit change value and a standard GIR obtained from the predetermined equation FX1 and the output command GT_MWD of the gas turbine or the actual output of the gas turbine.

Figure 11:
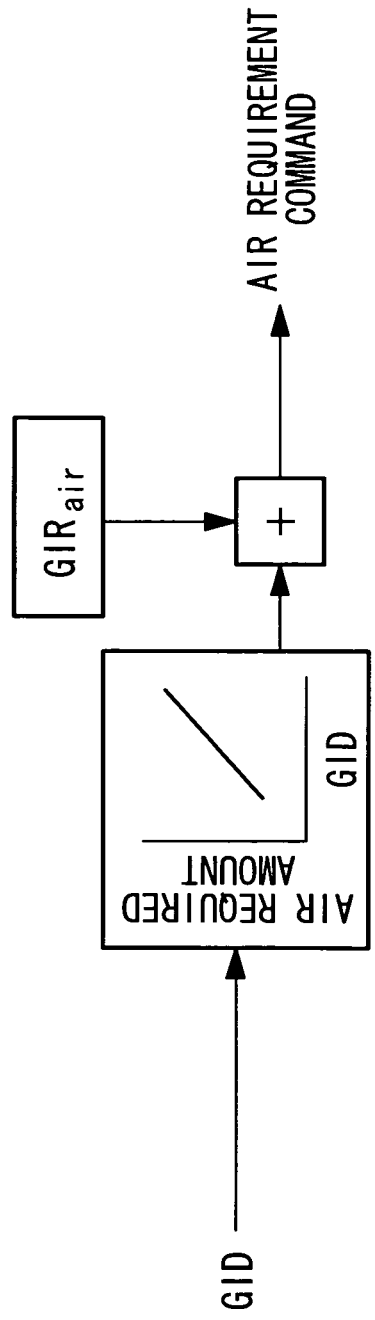
FIG. 11 is a view illustrating a method for setting an air requirement command according to the third embodiment of the present invention.

In a manner similar to that described above, as for the air requirement command, as shown in FIG. 11, the air required amount is obtained by using a table in which GID and the air required amount are related with each other, and in addition, an air acceleration command $GIR_{air}$ enhancing the operating conditions of the gasification furnace 3 is added to this air required amount, so that a final air requirement command is generated. In this case, the air acceleration command $GIR_{air}$ is a control value which is set based on the output command GT_MWD of the gas turbine 5b or the actual output thereof.

Figure 12:
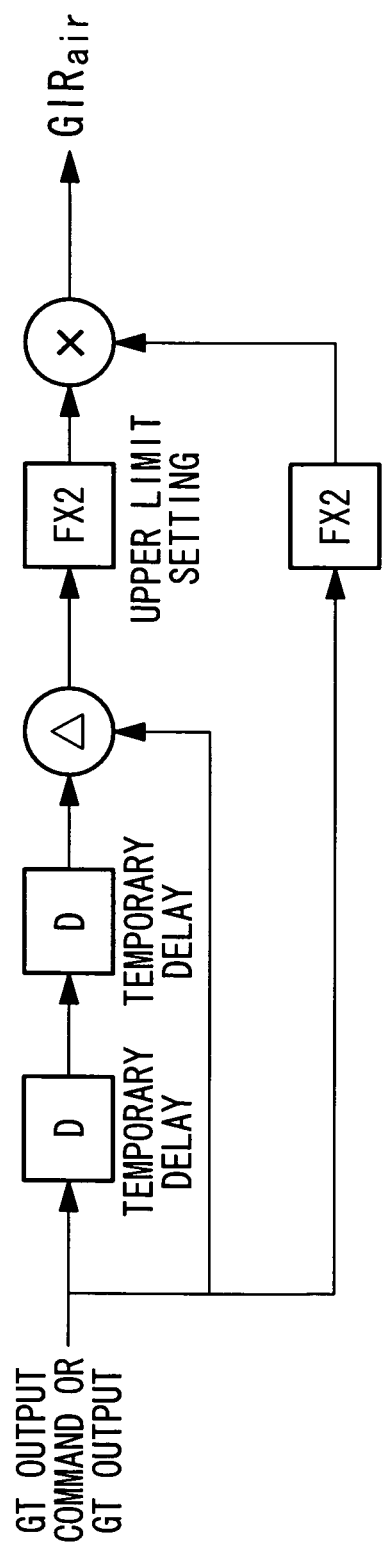
FIG. 12 is a view illustrating one example of a calculation procedure of the powdered-coal acceleration command.

For example, the air acceleration command $GIR_{air}$ is obtained by the structure shown in FIG. 12. As shown in FIG. 12, after the output command GT_MWD of the gas turbine 5b or the output thereof is received as input information, an upper limit change value of the air required amount is obtained from the differential rate of change of the input information and a predetermined equation FX2, and the air acceleration command $GIR_{air}$ is obtained by multiplying the upper limit change value and a standard GIR obtained from the predetermined equation FX2 and the output command GT_MWD of the gas turbine or the actual output thereof.

As described above, according to the IGCC and the operation control method thereof in this embodiment, to the required amounts of powdered coal and air obtained based on GID, the respective acceleration commands $GIR_{fuel}$ and $GIR_{air}$ which are set based on the output command GT_MWD of the gas turbine or the actual output of the gas turbine are further added so as to obtain the final powdered-coal requirement command and air requirement command; hence, the operation of the gasification furnace 3 during load variation can be further enhanced. As a result, the influence of output variation due to the delay in response of the steam turbine 7b can be reduced, and the output of the gas turbine can be stabilized at an early stage.

Fourth Embodiment

Next, an IGCC and an operation control method thereof according to a fourth embodiment of the present invention will be described.

In the first embodiment described above, although the change rate is set to zero or is decreased by the change rate setting unit 78 when a calorific abnormality of fuel gas is detected, in this embodiment, when the gas turbine 5b is shifted to temperature control, or the exhaust gas temperature of the gas turbine 5b is close to a predetermined temperature control starting temperature or more, the change rate is set to zero or is decreased by the change rate setting unit 78, so that the change of the gas turbine output command GT_MWD is suppressed.

Accordingly, when the gas turbine 5b is shifted to temperature control, the operation of the gas turbine 5b and that of the gasification furnace 3 can be stabilized.

Figure 13:
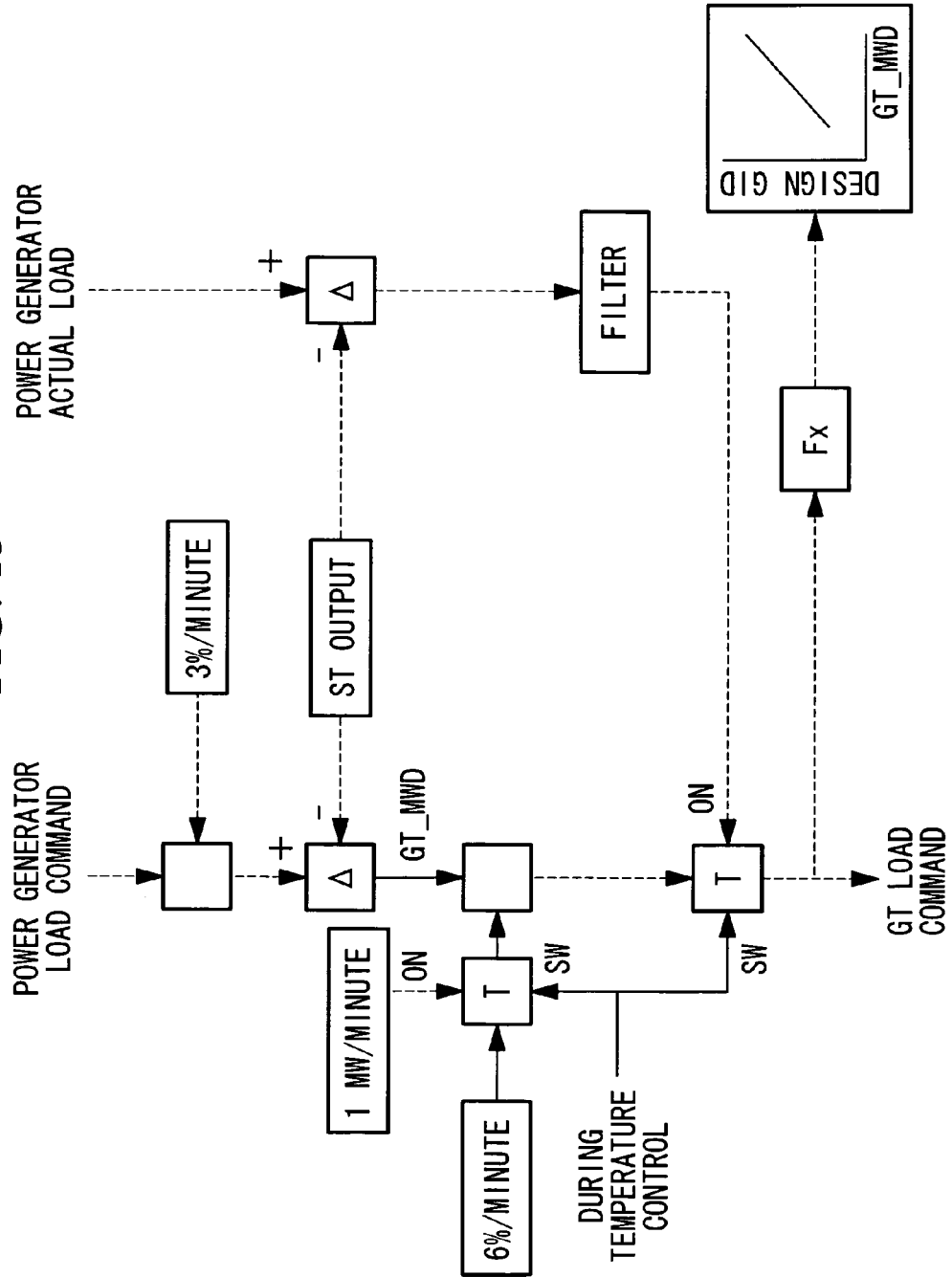
FIG. 13 is a view illustrating the control of a gasification furnace during temperature control.

In addition, as shown in FIG. 13, during the above temperature control, by using the actual output of the gas turbine 5b or an actual output of the gas turbine 5b, which is obtained after noise is reduced by filtering, instead of the gas turbine output command GT_MWD, the design GID may be obtained. Accordingly, the operation of the gasification furnace 3 can be stabilized during load variation.

For example, during temperature control in the gas turbine facility 5, regardless of a required load, that is, regardless of the gas turbine output command GT_MWD, the control is performed so that the inlet temperature of the gas turbine is maintained constant. On the other hand, in the gasification furnace 3, since the operation control is performed based on the gas turbine output command GT_MWD even during temperature control, the gas turbine 5b and the gasification furnace 3 are controlled by totally different parameters from each other; hence, the controls are separately performed.

In order to avoid the situation described above, in this embodiment, during temperature control, instead of using the gas turbine output command GT_MWD, since the operation of the gasification furnace 3 is controlled based on the actual output of the gas turbine, the condition of the gas turbine 5b can be reflected in the operation control of the gasification furnace 3.

As has thus been described, according to the IGCC and the operation control thereof in this embodiment, since the operation of the gasification furnace 3 can be performed by reflecting the condition of the gas turbine 5b therein even during temperature control, the overall plant can be stably operated.

The invention claimed is:

1. An operation control method of an integrated gasification combined cycle, comprising:
   providing a power generator command from a shaft load setting device;
   detecting a fuel gas calorific value, wherein when a calorific abnormality of the fuel gas is detected during load variation of a gas turbine, setting a load change command value of the gas turbine to zero or decreasing to a value greater than zero, and
   outputting a power generation output command of the gas turbine according to the load change command value and the power generator command.

2. The operation control method of an integrated gasification combined cycle, according to claim 1, wherein in a case in which the load change command value is decreased to a value greater than zero, a range of decrease of the load change command value is determined in accordance with the range of change of the calorific value of the fuel gas.

3. The operation control method of an integrated gasification combined cycle, according to claim 1, wherein after a load change demand of the gas turbine is set to zero or is decreased, the load change command value of the gas turbine is returned to a normal level in accordance with the range of change of the calorific value of the fuel gas.

4. An operation control method of an integrated gasification combined cycle, comprising:
   a first step of generating a power generation output command of a gas turbine using a value obtained by subtracting a power generation output of a steam turbine from a power generator output command that is generated from a shaft load setting device,
   wherein a gasification furnace is controlled using the power generation output command of the gas turbine obtained in the first step.

5. The operation control method of an integrated gasification combined cycle, according to claim 4, wherein, by using a table or a relational expression in which the power generation output command of the gas turbine and required amounts of elements to be charged into the gasification furnace are related with each other, the required amounts of the elements corresponding to the power generation output command of the gas turbine obtained in the first step are obtained, and correction amounts corresponding to a range of variation of the power generation output command of the gas turbine or a range of variation of the power generation output of the gas turbine are added to the obtained required amounts to determine final required amounts of the elements, so that based on the final required amounts, the amounts of the elements to be charged into the gasification furnace are controlled.

6. The operation control method of an integrated gasification combined cycle, according to claim 4, wherein, while the gas turbine is in a temperature control state, the load change command value of the gas turbine is set to zero or is decreased to a value greater than zero, and the power generation output command of the gas turbine is generated based on the load change command value.

7. The operation control method of an integrated gasification combined cycle, according to claim 4, wherein, while the gas turbine is in a temperature control state, the gasification furnace is controlled by using the power generation output of the gas turbine instead of the power generation output command of the gas turbine.

8. An integrated gasification combined cycle comprising
   a gas turbine control apparatus having a shaft load setting device that provides a power generator output command,
   a rate setting unit that receives a calorific value signal of fuel gas, wherein, when a calorific abnormality of the fuel gas is detected during load variation of a gas turbine, a load change command value of the gas turbine is set to zero or is decreased to a value greater than zero, and,
   a rate limiting unit that generates a power generation output command of the gas turbine based on an output from the rate setting unit and the power generator output command.

9. An integrated gasification combined cycle, comprising:
   a gas turbine control apparatus having a shaft load setting device that provides a power generator output command,
   a rate limiting unit for generating a power generation output command of a gas turbine using a value obtained by subtracting a power generation output of a steam turbine from the power generator output command, and a gasification furnace control apparatus for controlling a gasification furnace using the power generation output command of the gas turbine.

* * * * *